Dec. 7, 1943.   J. PERRELLI ET AL   2,336,123
PEACH SPLITTER AND PITTER
Filed June 9, 1939   7 Sheets-Sheet 3
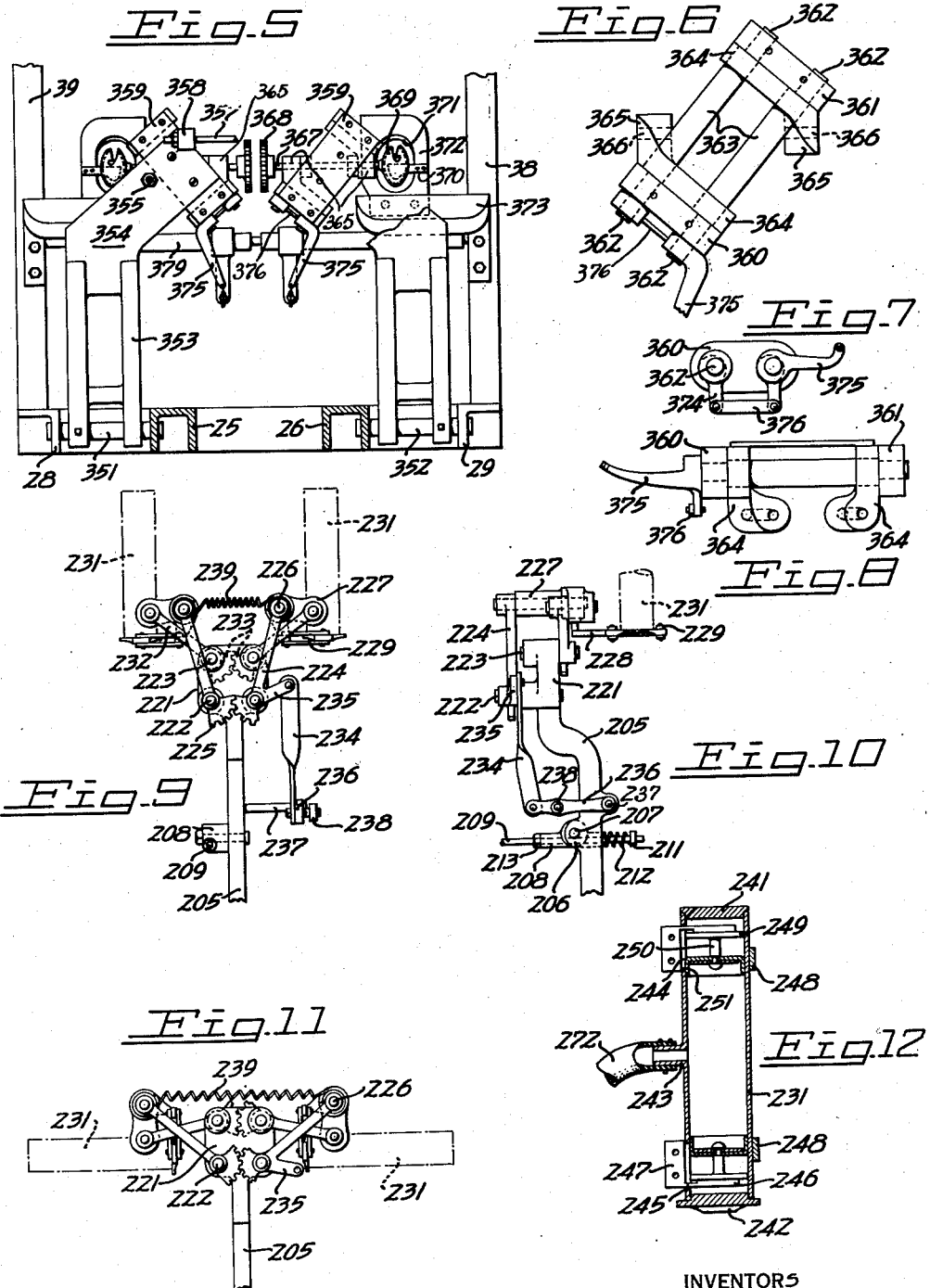
INVENTORS
ROBERT H. SMILIE
JOSEPH PERRELLI
BY
ATTORNEY Dec. 7, 1943.   J. PERRELLI ET AL   2,336,123
PEACH SPLITTER AND PITTER
Filed June 9, 1939   7 Sheets-Sheet 4

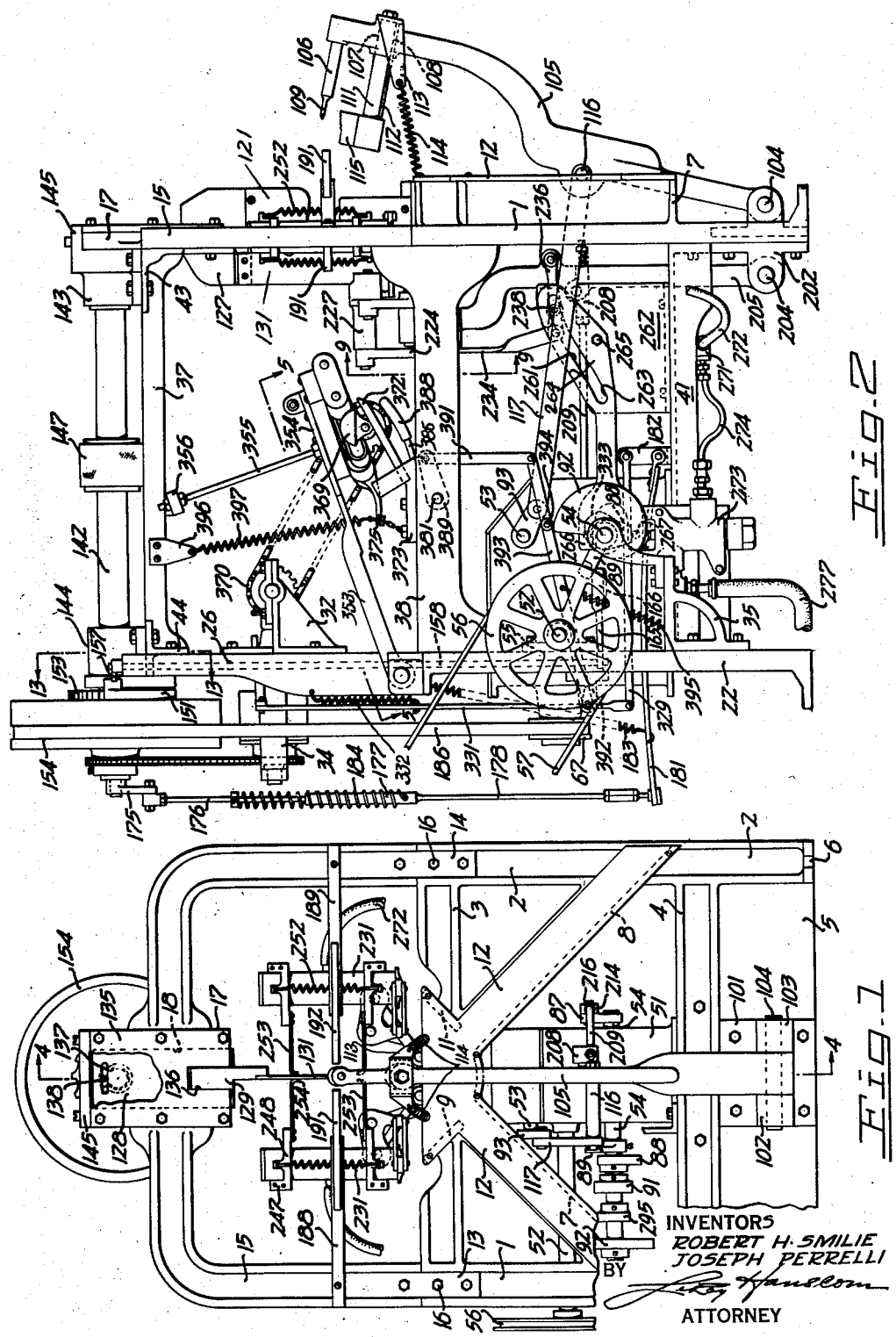

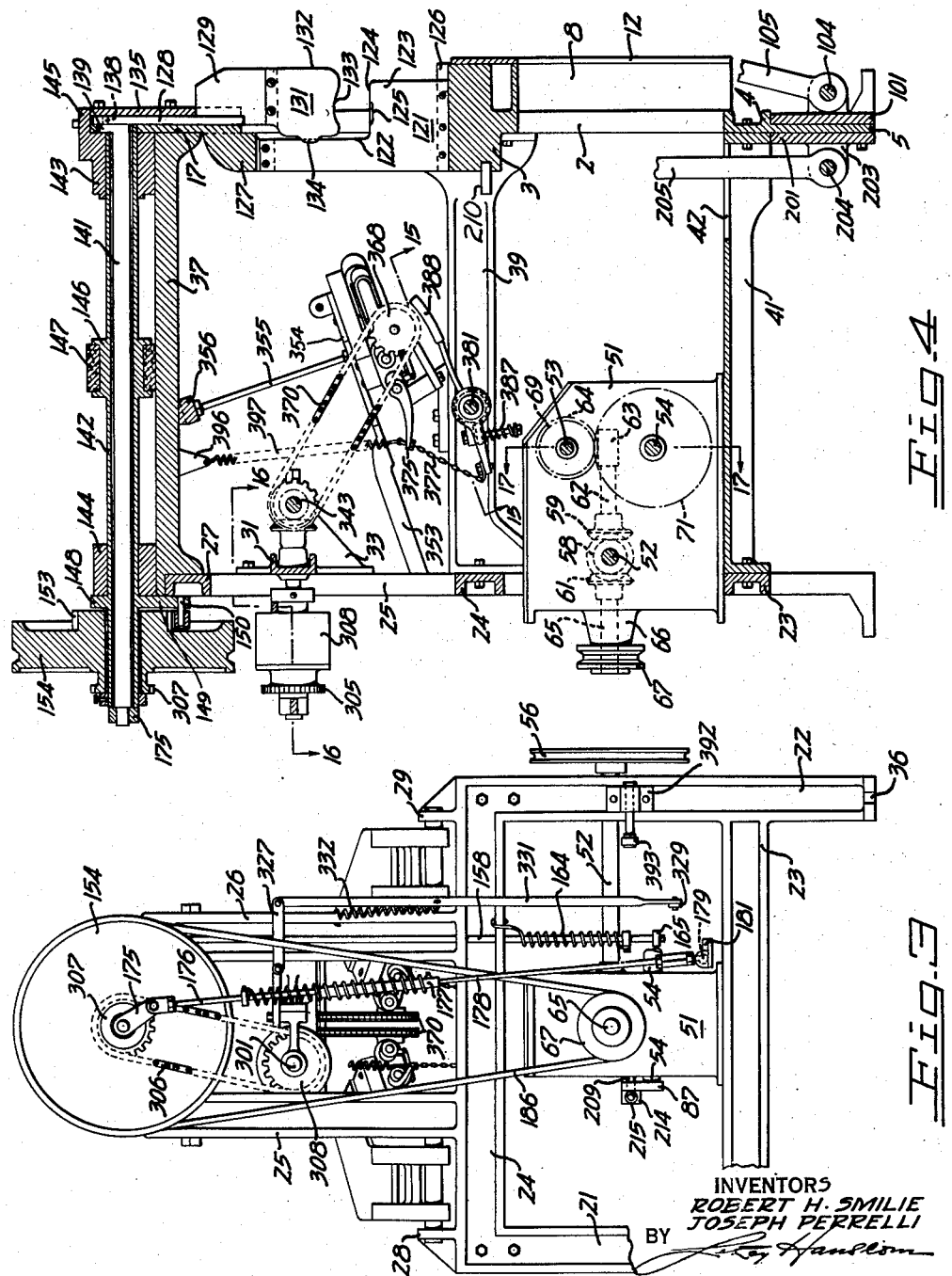

INVENTORS
ROBERT H. SMILIE
JOSEPH PERRELLI
BY
ATTORNEY

Dec. 7, 1943.   J. PERRELLI ET AL   2,336,123
PEACH SPLITTER AND PITTER
Filed June 9, 1939   7 Sheets-Sheet 5

INVENTORS
ROBERT H. SMILIE
JOSEPH PERRELLI
BY
ATTORNEY

Dec. 7, 1943.　　　J. PERRELLI ET AL　　　2,336,123
PEACH SPLITTER AND PITTER
Filed June 9, 1939　　　7 Sheets-Sheet 6
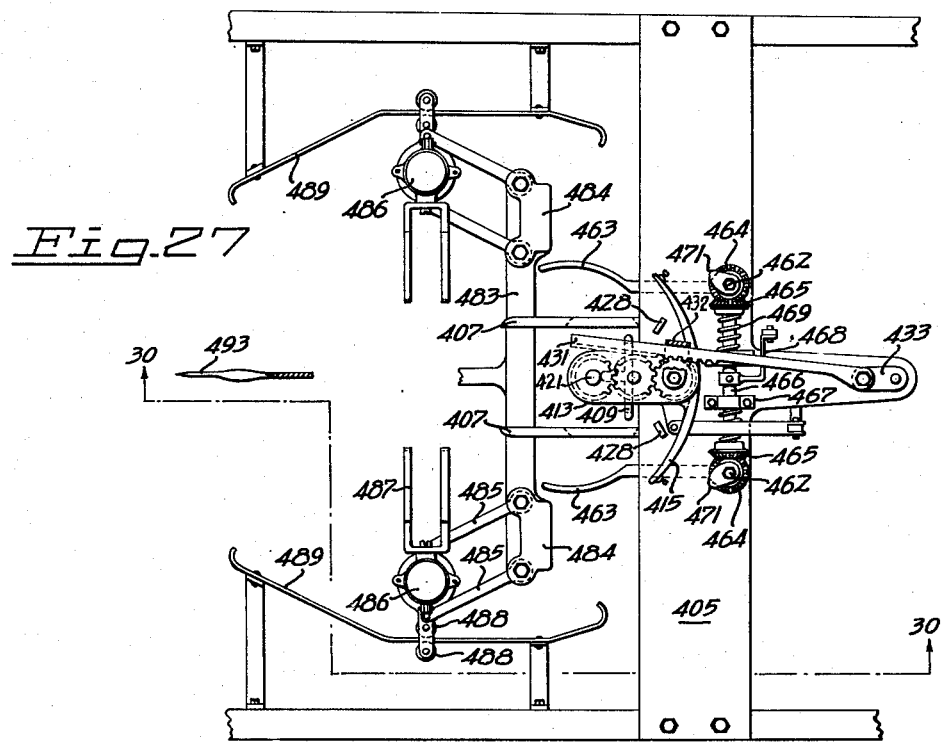
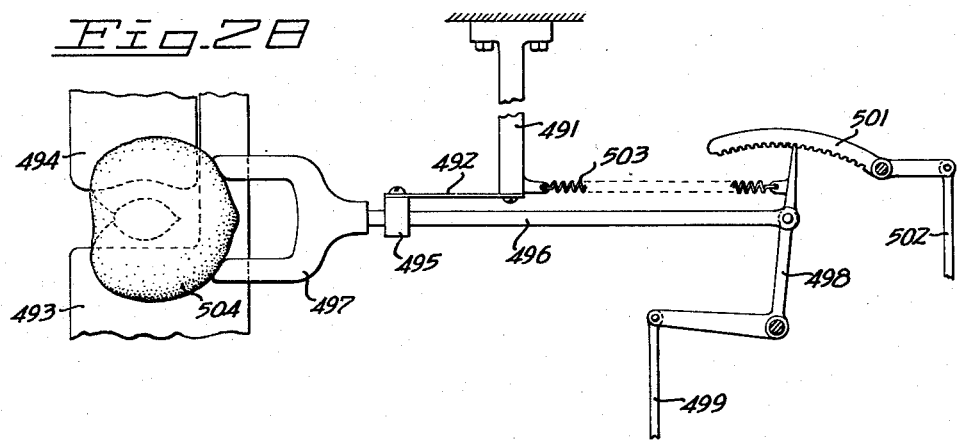
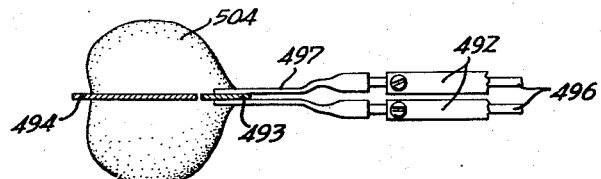
INVENTORS
ROBERT H. SMILIE
JOSEPH PERRELLI
BY
ATTORNEY Dec. 7, 1943.　　　J. PERRELLI ET AL　　　2,336,123
PEACH SPLITTER AND PITTER
Filed June 9, 1939　　　7 Sheets-Sheet 7

INVENTORS
ROBERT H. SMILIE
JOSEPH PERRELLI
BY
ATTORNEY

Patented Dec. 7, 1943

2,336,123

UNITED STATES PATENT OFFICE 2,336,123

PEACH SPLITTER AND PITTER

Joseph Perrelli, El Cerrito, and Robert H. Smilie, Albany, Calif.

Application June 9, 1939, Serial No. 278,194

33 Claims. (Cl. 146—28)

This invention relates to a combination splitter and pitter for splitting and pitting drupaceous fruit such as cling-stone peaches.

In splitting and pitting peaches it is desirable to lose as little flesh as possible, and this therefore necessitates that the peach be split by a knife rather than sawed in two and that the pitting knife pass through each peach half in strict conformity with the outer surface of the peach pit and immediately adjacent thereto, regardless of the size of the pit and its location within the peach. A further requirement is that the arch of each peach half, or that portion of the peach flesh immediately adjacent its stem end, be unimpaired, for if the arch is broken the peach half when canned will flatten out and present an unattractive appearance.

In the great majority of peaches, the stone or pit of the peach lies in a plane intermediate the suture and greatest diameter of the peach and the size of the pit is in proportion to the size of the peach, although its location within the plane referred to is likely to differ in every peach.

In general, the object of this invention is the provision of a combination splitter and pitter wherein consideration is taken of these relationships in so splitting and pitting the peach that there is the least possible loss of flesh and so that the arch of each peach half is unimpaired.

More specifically, one of the objects of this invention is the provision of a combination splitter and pitter wherein a peach is positively positioned at a splitting station with its pit lying in a fixed plane and with an end of each of the small and large diameters of the pit definitely positioned with respect to a pair of fixed but imaginary intersecting base or reference lines disposed within said plane.

Another object of the invention is the provision of a pitter wherein the cut face of a peach half is definitely positioned with respect to a predetermined plane adjacent a pitting knife, with one end of each of the small and large diameters of the peach pit lying respectively on a pair of fixed (although not necessarily real) fiducial, base or reference lines disposed within said plane, and wherein the cut of the pitting knife is made dependent upon the size of the peach and upon the position of the ends of the small and large diameters of the pit.

A further object of this invention is the provision, in combination with a peach splitting station and a peach pitting station, of a transfer mechanism for transferring a peach half, the pit of which is definitely located at the splitting station with respect to a fixed reference plane and a pair of reference lines associated therewith, to the pitting station so that the peach pit occupies the same relative position with respect to a reference plane associated with the pitting station and two reference lines disposed within this latter plane that the pit occupied with respect to the reference plane and lines of the splitting station.

A still further object of this invention is the provision of a splitter wherein a peach is impaled on a pair of relatively movable spaced coplanar splitting blades with its pit lying between said blades and wherein one of the blades is provided with a thickened portion or anvil for preventing the passage of this blade through the pit.

The invention possesses other advantageous features, some of which with the foregoing will be set forth at length in the following description where those forms of the invention which have been selected for illustration in the drawings accompanying and forming a part of the present specification are outlined in full. In said drawings, two forms of the invention are shown, but it is to be understood that it is not limited to such forms, since the invention as set forth in the claims may be embodied in a plurality of forms.

Referring to the drawings:

Figure 1 is a front elevation of a combination peach splitter and pitter embodying the objects of our invention.

Figure 2 is a side elevation of the pitter shown in Figure 1.

Figure 3 is a rear end elevation of the pitter shown in Figure 1.

Figure 4 is a vertical midsection taken on the line 4—4 of Figure 1.

Figure 5 is a section taken on the line 5—5 of Figure 2.

Figure 6 is a top plan view detail of the pitting knife positioning mechanism utilized in moving or displacing the pitting knife along a line having three components, one corresponding to the depth of the pit, one corresponding to the width of the pit, and one corresponding to the length of the pit.

Figure 7 is an end elevation of the mechanism shown in Figure 6.

Figure 8 is a side elevation of the mechanism shown in Figure 6.

Figure 9 is a section taken on the line 9—9 of Figure 2, showing a rear elevation of the transfer mechanism.

Figure 10 is a side elevation of the transfer mechanism shown in Figure 9.

Figure 11 is a rear elevation of the transfer mechanism in the position it assumes when a peach is being pitted.

Figure 12 is a longitudinal section taken through one of the air cylinders forming part of the transfer mechanism.

Figure 27 is a section of a modification of the machine shown in Figures 1 to 26 inclusive taken on the line 27—27 of Figure 30.

Figure 28 is a side elevation of a modified device for controlling the cut of the pitting knife in accordance with the size of a pit.

Figure 29 is a plan view of the gauge shown in Figure 28.

General theory of operation

Figure 13:
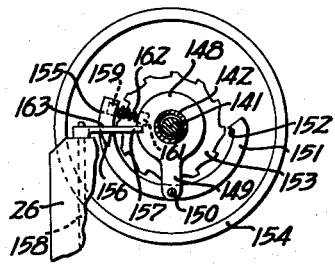
Figure 13 is a section taken on the line 13—13 of Figure 2 showing the clutch or shaft pick up mechanism used for periodically locking a torque tube or sleeve to a fly wheel for driving the movable blade of the splitter through the peach pit and back to its initial position.

In general, both modifications of our device as shown in the figures above described, comprise a peach splitter, a peach pitter, a feeding device for delivering whole peaches in a predetermined position to the splitter, a transfer mechanism for transferring peach halves from a predetermined position on the splitter to a predetermined position on the pitter, and means for automatically adjusting the cut of the pitting knife in relation to the size of the peach half and the location of the pit within the peach half.

The feeding mechanism is provided with means for so delivering a peach to the splitter that its pit is coplanar with the splitting blades, with its long or major diameter parallel to the cutting edges of said blades and with one end of said diameter lying on a known (although not necessarily real) reference line perpendicular to said cutting edges.

The splitter comprises a stationary lower blade and a movable upper blade lying in a vertical plane and normally spaced apart so that when a peach is delivered to the splitter its pit will be received between the cutting edges of the upper and lower blades. The lower blade is provided at its cutting edge with an anvil or thickened portion for arresting the downward movement of the peach due to the downward movement of the upper blade, first through the flesh of the upper portion of the peach and then through its pit, and also for prelocating the lower end of the smaller or minor diameter of the pit on the horizontal line defined by the cutting edge and anvil of the lower blade.

The transfer mechanism is in duplicate, each of its members being adapted to transfer a half peach from the splitter to the pitter. Each of these members is provided with a set of four fingers adapted to clamp and hold one half of the peach in its prelocated position with one end of each of the small and large diameters of the pit lying on the horizontal and vertical reference lines above referred to. The operation of these fingers takes place immediately after the lower edge of the peach pit has been forced into contact with the anvil carried on the lower blade and is independent of the size of the pit and of the location of the pit within the peach. After the peach and its pit are split, the transfer mechanism delivers the peach halves to the pitter with their pits prelocated with respect to a pair of imaginary fixed reference lines associated therewith.

The pitter comprises an apertured pitting plate adapted to receive the cut face of a peach half with its pit in the prelocated position above referred to. Operating through the aperture of the pitting plate is an arcuate pitting knife having associated with it means for moving the knife in relation to the size of the peach and in relation to the two fixed reference lines. This movement of the knife takes place prior to each cutting operation and has three components, one corresponding to the depth of the pit, one corresponding to the width of the pit, and one corresponding to the length of the pit.

Figure 30:
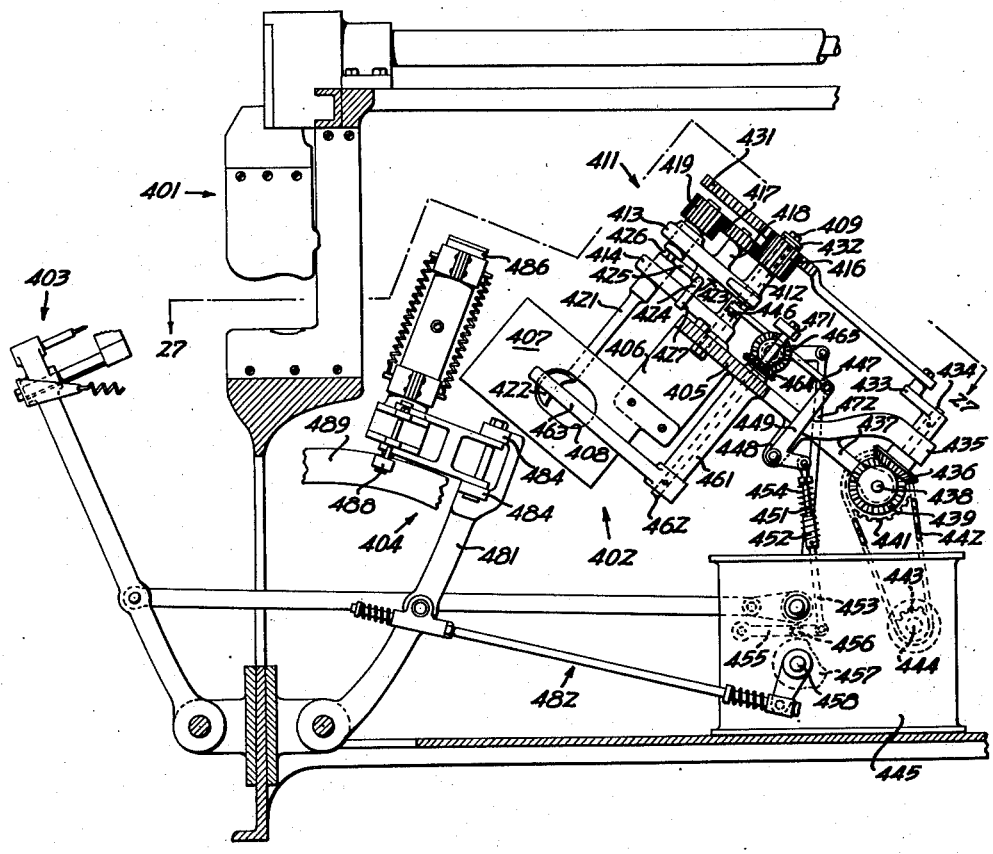
Figure 30 is a section taken on the line 30—30 of Figure 27.

In the modification shown in Figures 1 to 26 inclusive, the peach halves are simultaneously pitted by a pair of independent pitting knives each operating through an aperture in its associated pitting plate, whereas in the modification shown in Figures 27 and 30, a single pitting knife operating between two spaced, parallel pitting plates successively pits each peach half held in engagement with each of the pitting plates. The action of both modifications shown, however, depends upon determining the location of the pit within the peach at the splitting station, preserving this location in transferring each peach half to the pitter, and then automatically adjusting the cut of the pitting knife so as to conform to the position of the half pit within each peach half and to the size of each half pit.

Referring now to the modification shown in Figures 1 to 26 inclusive, and more particularly to Figures 1, 2, 3, and 4:

Frame

The combined splitter and pitter shown in these figures (1 and 2) comprises a generally rectangular cast iron frame consisting of a front end member or casting having vertical channel shaped legs 1 and 2, an upper horizontal cross member 3, a lower cross member 4, and a horizontally disposed web 5 extending between the vertical legs 1 and 2. Formed in the feet of the legs 1 and 2 are slots 6 for the accommodation of bolts for anchoring the frame to a suitable base. The front end casting is provided with a pair of inclined and forwardly extending members 7 and 8 each forming the floor of a chute on either side of the center line of the machine for the reception of the kernels of the split peaches. Screwed to the outer edges of the members 7 and 8 and to lugs 9 and 11, is a plate 12 serving as a guard for preventing the kernels from falling to the front of the machine. Disposed within the channels of the upper ends of the legs 1 and 2 are tongues 13 and 14 formed as extensions of the ends of an arcuate cast channel 15, and secured to the legs 1 and 2 by bolts 16. The arcuate channel 15 is formed on the vertical center line of the machine with a rectangular member 17 provided with a milled rectangular recess 18.

Figure 16:
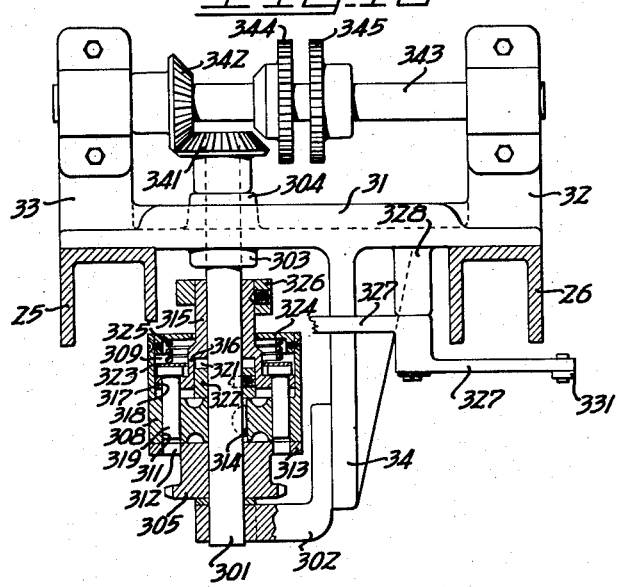
Figure 16 is an enlarged broken horizontal section taken on the line 16—16 of Figure 4, showing a portion of the shaft pick up mechanism used in controlling the movement of the pitting knives.

Spaced from the front end casting and in alignment therewith is a rear end casting (Fig. 3) comprising a pair of vertical legs 21 and 22, a lower cross member 23, an upper cross member 24, and vertical uprights 25 and 26, the upper ends of which are joined by a cross member 27 (Fig. 4). Extending upwardly from the ends of the cross member 24 are ears 28 and 29 (Fig. 3) formed with circular openings for the reception of a shaft to be described later. Between the vertical uprights 25 and 26 is a channel shaped cross member 31 (Figs. 4, 16) provided at either end with brackets 32 and 33 by which it is bolted to the vertical uprights and with a rearwardly extending bracket 34 (Figures 2, 4, and 16). Bolted to the lower inner face of the leg 22 is a bracket 35 (Figure 2), the purpose of which will be later described. The feet of the legs 21 and 22 are formed with slots 36 (Fig. 3) for the accommodation of foundation bolts.

Extending between and bolted to the front and rear castings of the frame is an upper transverse bar 37, a pair of spaced inwardly directed channels 38 and 39, and a relatively wide downwardly directed channel 41 (Figs. 2, 4) formed at its front end with a slot 42 (Figure 4). The bar 37 is formed at either end with brackets 43 and 44 (Fig. 2) through which it is bolted to the front and rear castings and which serve as supports for other elements to be later described.

Main drive

Figure 17:
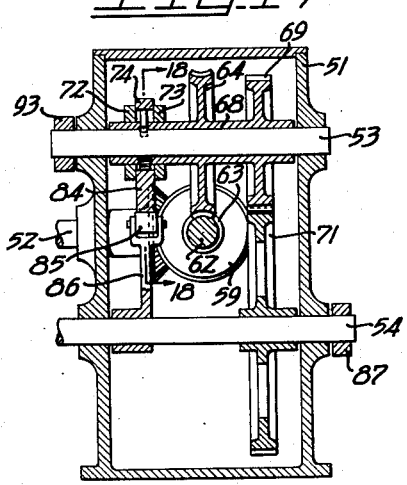
Figure 17 is a vertical section taken on the line 17—17 of Figure 4, showing in detail the primary drive for the various moving parts of my combined splitter and pitter.
Figure 18:
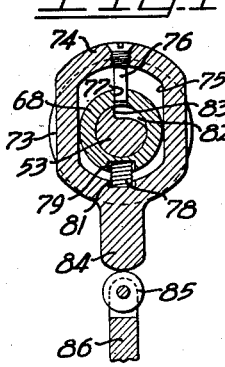
Figure 18 is a section taken on the line 18—18 of Figure 17.

Supported on and secured to the rear end of the transverse channel 41 (Fig. 4) and on the cross member 23 is a gear box 51, the sides of which are formed with bearings for the reception of a main drive shaft 52 and a pair of driven shafts 53 and 54 (Figure 17). The outer end of the shaft 52 is journaled on a pillow block 55 bolted to the inner face of the leg 22 and has keyed to it a pulley wheel 56 arranged to be driven by a belt 57 from any suitable source of power (Fig. 2). Carried on the inner end of the drive shaft 52 is a beveled gear 58 in mesh on one side with a complementary beveled gear 59 and on the other side with a similar beveled gear 61 (Figure 4). The beveled gear 59 is secured to a shaft 62 provided with a worm 63 arranged to mesh with a worm gear 64. The beveled gear 61 is secured to the inner end of a shaft 65 journaled in a bearing 66 formed as part of the gear housing 51, and carries at its outer end a pulley wheel 67 (Fig. 4) for driving the upper movable blade of the splitter. The worm gear 64 is secured to or formed as part of a sleeve 68 journaled on the shaft 53 and which also carries a gear 69 in mesh with a gear 71 keyed or otherwise secured to the shaft 54 (Fig. 17). The gears 69 and 71 have a gear ratio of 2 to 1 so that for every revolution of the gear 71 the gear 69 will make two revolutions. Associated with the shaft 53 and the sleeve 68 is a clutch consisting of a pair of spaced rings 72 and 73 fixed to the sleeve 68 and adapted to receive between them a collar 74 having a generally rectangular opening 75 (Fig. 18). Screwed through the upper wall of the collar 74 is a pin 76, the lower end of which has sliding engagement with a circular opening 77, thereby permitting the collar 74 to move radially with respect to the sleeve 68 against the action of a spring 78 accommodated in recesses 79 and 81 formed respectively in the sleeve 68 and in the inner lower surface of the collar 74 (Figure 18). The shaft 53 is formed with a recess 82 in circumferential alignment with the pin 76 and is provided with an abrupt wall 83. Formed as a part of the collar 74 is a projection 84 in circumferential alignment with a roller 85 carried by a crank 86 keyed or otherwise secured to the shaft 54 (Figs. 17, 18). Since the gear 71 is driven by the gear 69 and since the ratio between these two gears is 2 to 1, the roller 85 will contact the projection 84 upon every other revolution of the collar 74 keyed to the sleeve 68 by the pin 76. The roller 85 therefore serves upon every other revolution of the sleeve 68 to disengage the pin 76 from the recess 82 and consequently during every other complete revolution of the sleeve 68 there will be no rotation of the shaft 53. This assembly may therefore be considered as a lost motion or shaft pick up mechanism for intermittently rotating the shaft 53. Fixed to one end of the shaft 54 is a crank 87 (Figs. 3, 17) for reciprocating the transfer mechanism between the splitter and the pitter. To the opposite end of the shaft 54 is secured a cam 88 (Fig. 2) for controlling the movement of the transfer mechanism at each end of its two extreme positions and for aiding in the control of the movement of the upper movable splitter blade. Also mounted on this shaft is a trip 89 for controlling the splitter actuating mechanism, a cam 295 (Fig. 14) for operating an air valve which controls the movement of the spring fingers carried on the transfer mechanism, and another cam 92 (Fig. 2) for controlling the movement of the half peach holding mechanism associated with the pitter. Secured to one end of the shaft 53 is a crank 93 for actuating the feed mechanism.

Feed mechanism

Bolted to the web 5 of the front end casting is a plate 101 provided with spaced ears 102 and 103 for the reception of a pin 104 (Fig. 1). Journaled on the pin 104 is an upwardly extending arm 105 provided at its upper end with a pin 106 and with a bore 107 formed with a key-way 108 (Fig. 2). The pin 106 is formed with a reduced and sharpened end 109 adapted to be introduced into the stem end of a peach and contact the pit. Slidably disposed within the bore 107 is a shaft or pin 111 formed on its lower side with a spline or key 112 adapted to be received in the key-way 108 formed in the bore. Bolted to the outer end of the pin 111 is a U-shaped bracket 113, to the ends of which are secured coil springs 114 anchored in any suitable manner to the front end casting so as to urge the pin 111 inwardly toward the splitter. To the inner end of the pin 111 is secured a vertical blade 115 disposed beneath the sharpened end 109 of the pin 106 and slightly in advance thereof. Bolted to the arm 105 intermediate its ends is a pin 116, and connecting the end of this pin and the free end of the crank 93 carried by the shaft 53 is a connecting rod 117. The intermittent rotation of the shaft 53 is such that the arm 105 of the feed mechanism will hesitate momentarily at the end of each outward stroke so that the operator will have sufficient time to impale a peach in its correct position on the sharpened end 109 of the pin 106 and the blade 115 with the plane of the pit in the plane of the blade 115.

Splitter

The splitter comprises a stationary offset blade 121 having vertical cutting edges 122 and 123 and a horizontal cutting edge 124 and formed intermediate its ends with a thickened portion or anvil 125 (Fig. 4). Although the width of the anvil is sufficient to form a stop for the pit of a peach, by rounding the edges of the anvil the flesh of a peach may be made to pass around it without materially bruising the flesh. The stationary blade 121 is screwed at its lower end within an offset 126 formed in the upper face of the cross member 3 and at its upper end to a bracket 127 extending downwardly and rearwardly from the rectangular member 17 formed as part of the channel 15. Slidably disposed in the rectangular recess 18 of the member 17 is a plate 128 formed with an outwardly extending lug 129 (Figures 1 and 4). Screwed to the lower end of the lug 129 is a blade 131 formed with a vertical cutting edge 132 and with a lower recessed edge 133. Provided on the rear vertical edge of the blade 131 is a notch or saddle 134 arranged to straddle and slide over the vertical cutting edge 122 of the stationary blade 121 and thereby to maintain the two blades in perfect alignment. Bolted to the rectangular member 17 over the slidable plate 128 is a cover plate 135 formed with a central vertical recess 136 for the reception of the lug 129. Formed in the upper end of the plate 128 is a horizontally extending slot 137 for the reception of a crank pin 138.

The pin 138 is carried by a crank 139 (Fig. 4) formed on the end of a shaft 141 extending from the front of the machine to the rear of the machine. The shaft 141 is journaled within a tubular shaft or sleeve 142 supported at its forward end by a pillow block 143 and at its rearward end by a pillow block 144. The pillow block 143 is bolted to the bracket 43 and the pillow block 144 to the bracket 44 (Fig. 2). The pillow block 143 is provided with an overhanging portion 145 bolted at either end to the rectangular member 17 of the channel 15 (Figs. 1, 2). Formed intermediate the ends of the sleeve 142 is a brake consisting of a drum 146 circumscribed by a brake band 147, the ends of which are secured in any suitable manner to the bar 37. Surrounding the sleeve 142 and fixed thereto is a collar 148 having a radially extending crank 149. Extending rearwardly from the crank 149 is a pin 150 on which is journaled intermediate its ends a semi-circular pawl 151 (Figs. 2, 4, 13). One end of the pawl terminates in a tooth 152 in circumferential alignment with a ratchet wheel 153 formed as a part of a pulley and fly wheel 154 journaled on the outer end of the sleeve 142 (Figs. 3, 13). The opposite end of the pawl 151 is provided with a forwardly extending portion 155 having at its inner end a curved cam surface 156. Adjacent the surface 156 is a finger or trigger 157 fixed to the upper end of a rod 158 extending through the cross members 24 and 27 of the rear end casting. Carried in recesses 159 and 161 formed respectively in the portion 155 of the pawl and in the adjacent side of the collar 148 is a compression spring 162 urging the tooth 152 in engagement with the ratchet wheel 153 (Fig. 13). The outer end of the trigger 157 is notched out to form a rearwardly extending shoulder 163 for engaging the cam surface 156 of the pawl 151. The engagement of the shoulder 163 with the cam surface 156 holds the spring 162 under compression and consequently holds the tooth 152 of the pawl 151 free and clear of the ratchet wheel 153. Surrounding the rod 158 is a coil spring 164 having its upper end secured to the cross member and its lower end to a collar secured to the rod (Fig. 3). The spring 164 therefore serves to urge the trigger 157 in engagement with the surface 156 of the pawl 151. To the lower end of the rod 158 is secured a forwardly extending finger 165 having its free end formed with a steeply inclined surface 166 disposed in the path of travel of the outer end of the trip 89 carried by the shaft 54 (Fig. 2). During each revolution of the shaft 54, the trip 89 will momentarily cause a lateral displacement of the finger 165 and this movement will be transmitted through the rod 158 and against the action of the spring 164 to the trigger 157, thereby causing the trigger 157 to move out of engagement with the surface 156 of the pawl 151. Upon the release of the trigger 157, the spring 162 will move the tooth 152 into the line of travel of the ratchet wheel 153. The movement of the pulley and fly wheel will therefore be imparted to the sleeve 142 for one complete revolution and then the pawl and ratchet wheel will again be held out of engagement by the action of the trigger 157. The function of the brake associated with the sleeve 142 is to dampen the action of the fly wheel.

Figure 19:
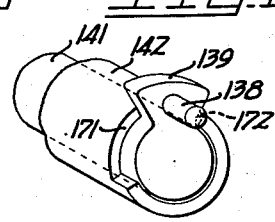
Figure 19 is an isometric projection of the lost motion connection utilized in driving the upper movable blade of the splitting mechanism.

As shown in Figure 19, the forward end of the sleeve 142 is formed with a notch or recess 171 for the accommodation of the crank 139 and which permits limited relative rotation between the shaft 141 and the sleeve 142. Upon the counter-clockwise rotation of the sleeve 142, a shoulder 172 defining one end of the recess 171 will engage the trailing edge of the crank 139, thereby imparting the movement of the sleeve 142 to the shaft 141 and its pin 138. The circular movement of the pin 138 will cause the plate 128 and the upper blade 131 to move downwardly through the peach and its pit and then upwardly to its initial position, although this complete cycle occurs in two stages, as will appear later.

Figure 21:
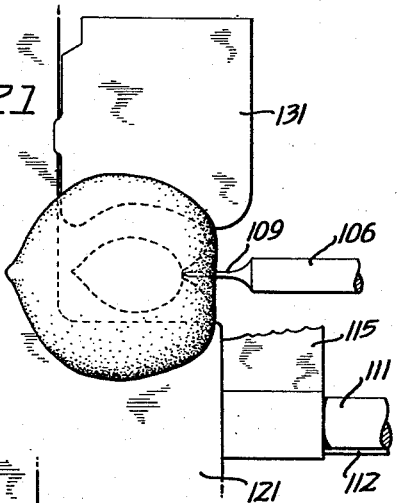
Figure 21 is a side elevation of a peach impaled on the splitting blades by the feeding mechanism.

Keyed to the rear end of the shaft 141 is a crank 175 connected with a rod 176 (Fig. 3). The lower end of the rod 176 slides within a sleeve 177 formed on the upper end of a rod 178. Secured to the lower end of the rod 178 by a ball and socket joint 179 is a stiff bar 181 pivoted at its inner end to a bracket 182 supported on the channel 41 (Fig. 2). A spring 183 secured at one end to the cross member 24 and at its other end to the outer end of the bar 181 serves to urge the rod 178 upwardly and against the action of a coil spring 184 having its upper end secured to the rod 176 and its lower end secured to the sleeve 177. The rod 176, sleeve 177 and spring 184 constitute a lost motion connection between the bar 181 and the crank 175. The bar 181 is arranged to be reciprocated about its pivotal point on the bracket 182 indirectly by the rotation of the cam 88 carried by the shaft 54. It will therefore be observed that through the lost motion connection just described the rotation of the shaft 54 effects a partial rotation of the shaft 141. The timing of these members is adjusted so as to cause the pin 138 carried at the forward end of the machine to move the upper splitting blade 131 downwardly through the flesh of a peach to the position shown in Figure 22. The further movement of the splitting blade 131 through the pit to the position shown in Figure 23 and then up to its initial position as shown in Figure 21 is effected by the rotation of the shoulder 172 of the sleeve 142 against the trailing edge of the crank 139. The periodic rotation of the sleeve 142 is accomplished through the periodic clutching of the pawl 151 to the ratchet wheel 153 carried by the pulley and fly wheel 154, which is continuously rotated by a belt 186 (Fig. 2) driven by the pulley 67 carried by the shaft 65.

Secured to either side of the channel 15 on a horizontal plane immediately above the cutting edge of the lower splitting blade 121 are a pair of inwardly extending bars 188 and 189. Carried on the inner end of each of these bars are spaced steel springs 191 and 192 which aid in holding the peach in its splitting position and also serve as a guard for the operator (Fig. 1).

*Transfer mechanism.*

The transfer mechanism comprises a plate 201 (Fig. 4) bolted to the web 5 and formed with spaced inwardly extending ears 202 and 203 (Figs. 2, 4). Journaled to a pin 204 carried by the ears 202 and 203 is an upwardly extending arm 205. Intermediate the ends of the arm 205 is an ear 206 (Fig. 10) to which is secured a horizontally disposed pin 207, and pivoted on this pin is a fitting 208. The fitting 208 is formed with a bore for slidably receiving the forward end of a laterally offset connecting rod 209 (Figs. 9, 10). Fixed to the forward end of the connecting rod 209 is a collar 211 for holding the outer end of a spring 212 surrounding the connecting rod (Fig. 10). Threaded over the connecting rod is a nut 213 which with the collar 211 and spring 212 limits the movement of the connecting rod through the fitting 208. This assembly therefore serves as a lost motion connection permitting the transfer mechanism to hesitate when at its pitting position.

The opposite or rear end of the connecting rod 209 extends through a fitting 214 pivoted to the crank 87 carried on the shaft 54 (Figure 3). Secured to the extreme rear end of the rod 209 is a collar 215 for preventing the connecting rod from becoming disengaged from the fitting 214. Immediately forward of the fitting 214 and surrounding the connecting rod is a coil spring, the forward end of which engages a collar 216 secured to the connecting rod 209 (Figure 1). This assembly serves as a lost motion connection for permitting the transfer mechanism to hesitate when at its splitting position. Forward movement of the arm 205 is limited by a stop 210 secured to the cross member 3 (Fig. 4).

The upper end of the arm 205 terminates in a plate 221 on which the mechanism for operating the peach half gripping fingers is mounted (Fig. 9). Journaled in bosses formed on the plate 221 are a pair of spaced lower pins 222 and a pair of spaced upper pins 223. Since as shown in Figures 9 and 11 the mechanism carried by the plate 221 is symmetrical about a vertical plane passing through the arm 205, the same reference numerals will be used to designate corresponding elements on each side of this plane. Welded to each of the pins 222 is a link 224 formed at its inner end with a gear sector 225. The outer end of the link 224 carries a pin 226 on which is journaled a bell crank 227. To one arm of the bell crank 227 is secured a bar 228 and fixed to this bar are a pair of parallel resilient strips 229 (Fig. 10). Secured between the outer ends of these strips is an air cylinder 231. The resilient strips 229 therefore serve as a lost motion mechanism between the bar 228 and the air cylinder 231. Pivoted to the other arm of the bell crank 227 is a link 232 which is also pivoted to the pin 223 and is formed with a gear sector 233. The two complementary gear sectors 225 mesh with each other and are actuated by a connecting rod 234 pivoted to a crank 235 extending outwardly to one only of the sectors 225. The lower end of the connecting rod 234 is pivoted to one end of a link 236, the other end of which is journaled on a pin 237 carried by the arm 205, and intermediate the ends of the link 236 is a follower roller 238. Extending across the two opposed and complementary bell cranks 227 is a coil spring 239 for urging the two bell cranks toward each other. The coacting pairs of sectors 225 and 233 simply serve to impart the movement of the crank 235 simultaneously to both halves of the device. By means of this assembly in conjunction with a cam to be later described and associated with the follower roller 238, the air cylinders are made to assume a vertical position at the splitting station and to rotate outwardly through 90° in traveling from the splitting station to the pitting station so that at this latter station they assume a horizontal position beneath the pitting station.

In some instances peaches are received for splitting and pitting with their pits cracked or split along their suture. In these cases the anvil associated with the lower splitting blade will only partially arrest the downward movement of the pit under the influence of the upper blade and for this reason it is highly desirable that the strips 229 be somewhat resilient so as to serve as a lost motion connection between the peach gripping fingers and the air cylinder. By this construction the air cylinders and the associated peach gripping fingers are permitted to move downwardly with the peach half as the peach is being split.

Each air cylinder 231 (Figure 12) is closed at each end by caps 241 and 242 and is provided with a hose connection 243. Formed at each end of the cylinder is a longitudinally aligned slot 244 for the reception of a narrow neck 245 connecting a disc 246 within the cylinder to a lug 247 carried by a split collar 248 surrounding the cylinder. The lug 247 is arranged to slide on the surface of the cylinder over the slot 244. Disposed within each end of the cylinder is a disc 249 formed with a central inwardly extending pin 250 carrying a leather or composition cup 251. As best shown in Figures 1 and 2, the collars 248 surrounding each cylinder are urged toward each other by springs 252 secured to the collars on opposite sides of the cylinder. By introducing air under superatmospheric pressure to the cylinder, the collars 248 will be forced outwardly by the discs 249 floating within the cylinder. This movement will be opposed by the action of the springs 252 and the longitudinal movement of one collar does not necessarily have to be equal to the movement of the opposed collar. The movement of each collar depends upon the size of the peach being split and the prelocated position of the peach on the splitter.

To each of the collars 248 is secured a pair of spaced inwardly directed peach gripping fingers 253 formed with right angularly disposed tips 254 arranged at the extreme forward position of the transfer mechanism to abut against the splitting blades and at the extreme rearward position of the transfer mechanism to abut against the pitting plate of the pitter (Figures 1, 22, 23, 24, and 25).

The follower roller 238 carried by the link 236 is arranged to travel in a forwardly inclined cam slot 261 formed in a vertical plate 262 bolted to the channel 41 (Fig. 2). The width of the slot 261 is somewhat greater than the diameter of the roller 238 and therefore the roller may be given a limited vertical movement at any given point along the slot. An upward vertical movement of this character is given the roller (and consequently the peach gripping fingers 253) by a supplementary interrupted cam slot 263 formed in a lever 264. The lever 264 is pivoted intermediate its ends and adjacent to the plate 262 by a bolt 265 and is provided at its end with a fork 266 (Fig. 2). Extending outwardly from each tyne of this fork are upper and lower follower pins 267 in circumferential alignment with and arranged to be successively engaged by the cam 88 carried by the shaft 54. The timing of this assembly is such that the cam 88 engages the lower pin 267 as the transfer mechanism is approaching its extreme forward position so as to force the peach gripping spring fingers 253 into positive engagement with the splitting blades just prior to the initial downward movement of the upper blade 131. At the extreme rearward position of the transfer mechanism the cam 88 engages the upper pin 266 so as to force the fingers 253 into positive engagement with the pitting plate just prior to the upward movement of the peach holders to be later described.

Figure 14:
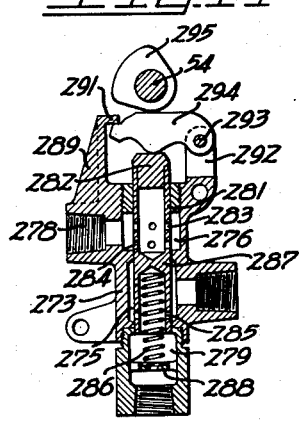
Figure 14 is a detail in vertical section of the cam operated air valve used in controlling the air cylinders forming part of the transfer mechanism.

Establishing communication between the hose connection 243 of each of the air cylinders 231 and a T 271 is a flexible air hose 272, and communication between the T 271 and an air valve 273 is established by a tube 274 (Figure 2). As shown in Figure 14, the air valve 273 is formed with a chamber 275 with which the tube 274 communicates, with a chamber 276 in communication with a hose 277 (Figure 2) which in turn communicates through an intake 278 (Fig. 14) with a suitable source of superatmospheric air, and with an air release chamber 279. Arranged to slide within these three chambers is a sleeve 281 closed at its upper end with a cap 282 and formed with a series of spaced apertures 283, 284, and 285. The apertures 283 and 284 are arranged to establish communication between the chambers 276 and 275 and the apertures 285 are arranged to establish communication between the chambers 275 and 279. Urging the sleeve 281 to its upper position is a spring 286 seated at its upper end against a wall 287 intermediate the ends of the sleeve, and at its lower end against a web 288. Extending upwardly from the valve is a lug 289 formed with a keeper 291. Diametrically opposed to the lug 289 is a pair of spaced ears 292 carrying a pin 293, and pivoted on this pin is a lever 294. The central lower part of this lever is adapted to seat on the cap 282 and its free end to engage the keeper 291. Engaging the upper face of the lever 294 is a cam 295 carried by the shaft 54. The shape and timing of this cam are such that air is admitted to the cylinders 231 just after the transfer mechanism reaches its extreme rearward position at the pitting station so as to release the peach halves carried by its associated fingers and to hold said fingers spread for the reception of the succeeding pair of peach halves at the splitting station. As soon as these fingers abut the sides of the splitting blades, the cam 295 further depresses the sleeve 281 so that communication with the chambers 275 and 279 is established, thereby relieving the pressure in the cylinders 231 and permitting the springs 252 to bring the fingers 253 into engagement with the peripheral edges of each peach half. It will therefore be seen that the peach gripping fingers are spread and contracted once during each cycle of operation. With a peach half interposed between the fingers 253, the action of the springs 252 and the sliding fit of the collars 248 on the cylinders 231 is such that the collars are cramped on or locked to the cylinders, thereby preventing further relative movement between the peach halves and cylinders until the peach halves have been delivered to their respective pitters.

In operation, therefore, the transfer mechanism oscillates between the splitter and the pitter, hesitating at each end of its stroke. At the splitting station the air cylinders assume a vertical position (Fig. 9) and the peach gripping fingers grip each peach half with the stem end of each half pit lying on a vertical line determined by the inward throw of the feed mechanism and with the lower edge of each half pit in contact with the anvil of the lower splitting blade. Upon leaving the splitter and in traveling back to the pitter, the left hand air cylinder as viewed from the front of the machine (Figure 1) rotates through substantially 90° in a counter-clockwise direction so as to assume a horizontal position (Fig. 11) beneath the left hand pitter and the right hand cylinder rotates through substantially 90° in a clockwise direction to assume a corresponding position under the right hand pitter. As so transferred, the stem end of each half pit, regardless of the size of the pit, is always made to lie on a fixed horizontal line adjacent the pitter.

The lower edge of each half pit as viewed at the splitter becomes an inner edge at the pitter and regardless of its size is always made to lie on a fixed longitudinal line at right angles to said horizontal line. In other words, the right hand half pit is made to lie in the first quadrant of a circle as measured in a clockwise direction, with the inner end of its small or minor diameter lying on the longitudinal axis of the circle and with the lower end (stem end) of its long or major diameter lying on the horizontal axis of the circle. The left hand half pit assumes a corresponding position in the fourth quadrant of a circle taken on the opposite side of the center line of the machine.

*Pitting mechanism*

The drive for the pitting mechanism, as best shown in Figures 16 and 3, comprises a shaft 301 journaled in an arm 302 carried by the bracket 34 and in bosses 303 and 304 formed integral with the cross member 31. Journaled on the shaft 301 is a sprocket 305 adapted to be driven by a chain 306 carried by a similar sprocket 307 formed on the rear end of the pulley and fly wheel 154. Associated with the sprocket 305 is a shaft-pick-up mechanism which performs a function similar to the function performed by the assembly shown in Figure 13. This shaft-pick-up mechanism comprises a cylinder 308 provided with a recess 309 and formed at its lower end with a plurality of apertures 311 in circumferential alignment with apertures 312 formed in a flange 313 of the sprocket 305. The cylinder 308 is keyed to the shaft 301 by a key 314. Slidably disposed on the shaft 301 and accommodated within the recess 309 of the cylinder 308, is a sleeve 315 formed with a downwardly extending collar 316. The collar 316 terminates in a flange 317 formed with a plurality of apertures 318 for the reception of headed pins 319. Accommodated within a recess 321 formed in the collar 316 and secured to the shaft 301 is a ring 322 abutting the inner wall of the cylinder 308. The pins 319 are of sufficient length to pass not only through the apertures 318 of the flange 317 but also through the apertures 311 and 312 when the flange 317 is in contact with the inner radial wall of the cylinder 308. Disposed over the heads of the pins 319 is a thin metal disc 323 and extending between this disc and an annulus 324 secured within the inner end of the cylinder 308 is a coil spring 325 for indirectly urging the pins 319 into registration with the apertures 312 of the sprocket 305. Secured to the outer end of the sleeve 315 is a collar 326 formed on its end adjacent the annulus 324 with an inclined peripheral surface. Engaging this surface is the outer end of a lever 327 pivoted intermediate its ends to a boss 328 extending outwardly from the cross member 31. The action of the lever 327 is such as to hold the collar 315 in its extended position against the compression of the spring 325. Upon movement of the lever 327 away from the collar 326, the spring 325 forces the pins 319 into the apertures 312, thereby securing the shaft 301 to the continuously rotating sprocket 305. Connecting the outer end of the lever 327 with the outer end of a stiff bar 329 is a link 331 (Figs. 2, 3). Secured intermediate the ends of this link is one end of a coil spring 332, the other end of which is secured to the upright 26 of the rear end frame (Fig. 3). The function of this spring is to urge the free end of the lever 327 into engagement with the beveled surface of the collar 326 so as normally to maintain the shaft 301 uncoupled from the sprocket 305. The forward end of the bar 329 is pivoted to the bracket 182 and is intermittently depressed by a cam 333 carried on the shaft 54.

The inner end of the shaft 301 carries a beveled gear 341 arranged to mesh with a beveled gear 342 keyed or otherwise secured to a horizontally disposed shaft 343 journaled in the brackets 32 and 33 (Fig. 16). Intermediate the ends of the shaft 343 are a pair of spaced sprockets 344 and 345.

The pitting mechanism per se is best shown in Figures 5, 6, 7, and 8 and since an independent pitter is required for each half peach, the pitter has been shown shown in duplicate. Since these pitters are mirror images of each other, the same reference numerals will be used to designate corresponding elements in each pitter. Journaled in the upright 25 and the ear 28 is a shaft 351 and journaled in the upright 26 and the ear 29 is a shaft 352 (Figs. 3, 5). Fixed to each of these shafts is an upwardly inclined arm 353 terminating in an upwardly inclined and outwardly directed plate 354 (Figs. 2, 4, 5). The plate 354 is held in a predetermined inclined position by a tie rod 355 supported from a bracket 356 carried by the bar 37 (Fig. 4). The two outer ends of the plate 354 of each pitter are tied together by a tie rod 357 extending through lugs 358 carried by each of the plates (Fig. 5). Each plate 354 is therefore immovably secured to the frame although its position may be adjusted by means of the tie rods 355 and 357. Secured to the under side of each plate 354 is a substantially coplanar right angularly disposed plate 359. Fixed to the under side of the plate 359 is a pair of spaced parallel blocks 360 and 361 (Figs. 6 to 8), and journaled in these blocks are the offset or eccentrically disposed reduced ends 362 of a pair of parallel shafts 363 (Fig. 6). Carried on the shafts 363 is a pair of spaced brackets 364 provided with offset ears 365 formed with horizontally aligned bearings 366. Journaled in these bearings is a shaft 367 (Fig. 5) secured at its inner end to a sprocket 368 and carrying at its outer end a spoon shaped pitting knife 369. Longitudinal movement of the shaft 367 with respect to its bearings 366 is prevented by collars secured to the shaft immediately adjacent the inner faces of the offset ears 365 as shown in dotted line in the right half of Figure 5. The sprockets 368 are driven by chains 370 passing over the sprockets 344 and 345 (Figs. 4, 16).

Figure 15:
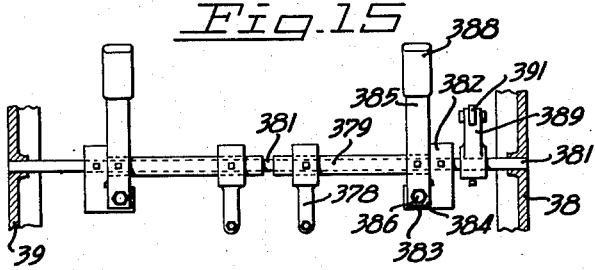
Figure 15 is a section taken on the line 15—15 of Figure 4, showing in plan view the duplex peach half holding mechanism at the pitting station.

The pitting knife 369 is arranged to operate through an aperture 371 of a pitting plate 372 carried by a bracket 373 and about a pit engaging finger 370 (Figs. 2, 5). The brackets 373 (one for each pitter) may be bolted or otherwise secured to the channels 38 and 39. Keyed to the reduced off center ends 362 of the shafts 363 is a crank 374 and a bell crank 375 tied together by a link 376 (Fig. 5, 7). Rotary movement is imparted to the shafts 363 by a chain 377 (Fig. 4) secured at its upper end to the bell crank 375 and at its lower end to a lever 378 carried by a sleeve 379 (Figure 15). The sleeve 379 is journaled on a shaft 381 extending between and journaled in the channels 38 and 39. Also secured to the shaft 381 is a collar 382 formed with an offset lug 383 in line with the rearwardly extending end portion 384 of a half peach holder 385. Extending through the portion 384 of the lug 383 is a bolt 386 carrying at its lower end a spring 387 (Fig. 4) for the purpose of urging the portion 384 (Fig. 15)

and the lug 383 in engagement. The half peach holder 385 is secured to the sleeve 379 and is provided at its forward peach engaging end with a soft rubber sleeve or pad 388 (Figs. 2, 4, 15). Secured to the shaft 381 is a lever 389 having pivoted to its free end a downwardly extending link 391 (see Figure 2). Connected between the lower end of the link 391 and a lug 392 secured to the gear box 51 is a link 393 provided intermediate its ends with a cam follower roll 394 (Fig. 2). The cam follower roll is arranged to travel on the peripheral cam surface of the cam 92 during the clockwise rotation of this cam. A coil spring 395 secured at its upper end to the link 393 and at its lower end to the frame maintains the follower roll 394 in contact with the cam 92. As shown in Figure 2, the cam 92 is holding the half peach holder 385 in its peach engaging position. Extending between a lug 396 and the bell crank 375 is a spring 397 tending to rotate the bell crank 375 in a clockwise direction as shown in Figures 2, 4, and 7. Since the shafts 363 oscillate about offset axes and since the brackets 364 are journaled on these shafts, oscillatory movement of the shafts will be imparted to the brackets and to the pitting knife shaft 367 journaled in the offset ears 365 (Figs. 5, 6). Any point on the shaft may therefore be given a horizontal as well as a vertical component in a vertical plane passing through such point at right angles to the shafts 363. Furthermore, since the shafts 363 are diagonally disposed with respect to the shaft 367, oscillatory movement of the shafts 363 will effect a three-component movement of the shaft 367, one parallel to the axis of the shaft 367, one vertical, and one horizontal. In other words, this assembly provides a means whereby, depending upon the size of a peach half, the pitting knife may be displaced vertically, laterally, and longitudinally prior to the actual pitting operation so that its cut will conform strictly to the contour of the half pit. In the position as shown in Figure 5, the knife is centered over the largest size pit which is expected to be removed. Upon delivery to the pitting plate of a smaller half peach, the peach holder 385 will of course move up closer to the pitting plate 372 and in so doing will depress the crank 375, thereby causing a forward, inward, and upward displacement of the pitting knife just prior to its cut around the pit.

*Operation*

Figure 20:
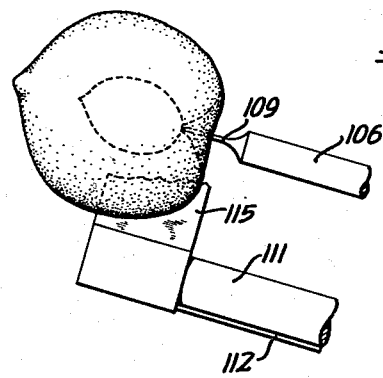
Figure 20 is a side elevation of the feed mechanism used for feeding a peach to the blades of the splitting mechanism.
Figure 22:
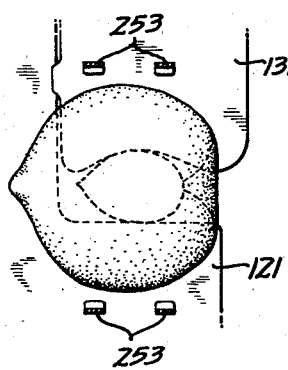
Figure 22 is a side elevation of a peach impaled on the splitting blades with its pit held in a prelocated position by the lower stationary splitting blade and the coacting upper movable splitting blade, and with the fingers of the transfer mechanism about to engage the peach halves preparatory to the final splitting operation.
Figure 23:
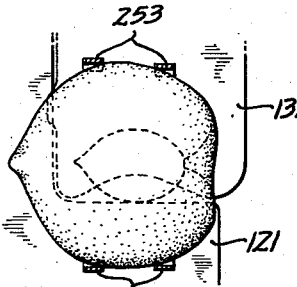
Figure 23 is a side elevation of a peach engaged on either side by the fingers of the transfer mechanism and split by the downward movement of the upper blade against the lower stationary blade and with the lower edge of its pit resting on the edge or anvil of the lower blade.

The operation of the combined splitter and pitter above described is as follows:

The feed mechanism reciprocates in front of the splitter and upon reaching the limit of its backward movement hesitates for a sufficient length of time to permit an operator to impale a peach on the pin 106 and the blade 115, with the suture of the peach lying in the vertical plane of the splitting blades (Figure 20). The feed mechanism impales the peach on the blades 121 and 131 of the splitter with its pit intermediate the cutting edges of these blades (Figure 21). The upper blade 131 then moves downwardly through the flesh of the peach and upon contacting the upper edge of the pit forces the whole peach downwardly until the lower edge of the pit engages the anvil and cutting edge of the lower blade 121 (Figure 22). In the meantime, the transfer mechanism which operates between the splitter and the pitter has advanced to a point adjacent the splitter with its associated air cylinders disposed in a vertical position. The outer ends of the peach gripping fingers 253 are then forced into positive engagement with the blades 121 and 131 through the action of the supplementary interrupted cam slot 263 formed in the lever 264. While the peach and its pit are still in the position shown in Figure 22, the air pressure in the air cylinders is relieved by the air valve 273, whereupon the springs 252 operate to close the outer inwardly turned ends of the fingers 253 upon each peach half, as shown in Figure 23. As soon as this action has taken place, the upper splitting blade 131 completes its cycle of operation by passing downwardly through the peach and its pit and then returning to its initial position as shown in Figure 21. As already explained, the fingers 253 in closing in upon a peach half, cause the collars 248 on which the fingers are carried to bind on the air cylinders so that further movement between the peach half and the air cylinder is prohibited until the fingers are again spread by an increase in pressure within the cylinder. This locking action is of considerable importance, for it enables a half peach to be delivered to the pitter with one end of each of its major and minor diameters lying on the right angularly disposed predetermined fiducial or reference lines above referred to.

Figure 24:
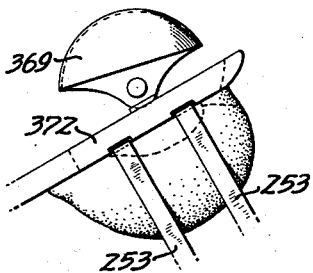
Figure 24 is a side elevation of a half peach held by the fingers of the transfer mechanism against the lower face of the pitting plate and through which the pitting knife is about to rotate.
Figure 25:
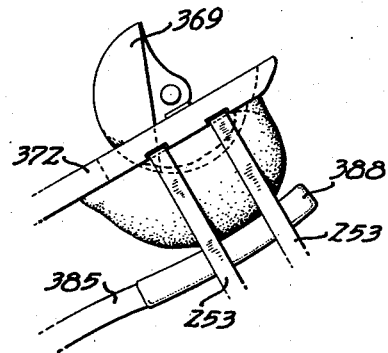
Figure 25 is a side elevation of a half peach held with its cut face against the pitting plate and through which the pitting knife is passing to sever its half pit.
Figure 26:
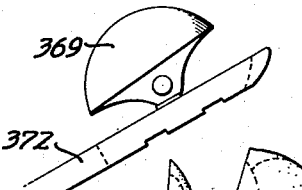
Figure 26 is a side elevation of a pitted peach half as it is falling away from the pitting plate.

The transfer mechanism then moves rearwardly to the pitter, and in so doing each of the air cylinders rotates downwardly through an angle of substantially 90° so as to assume a horizontal position beneath the pitting plates. At the end of the rearward stroke of the transfer mechanism, the supplementary cam slot 263 serves to raise the transfer mechanism so that the outer ends of the peach gripping fingers 253 engage the lower face of the pitting plate 372, as shown in Figure 24. If desired, the lower face of the pitting plate 372 may be provided with shallow recesses for the accommodation of the turned-over ends of the fingers 253, as clearly shown in Figures 24, 25, and 26. Upon contact of the fingers 253 with the pitting plate 372, the peach holder 385 is elevated so that it contacts the outer surface of the peach half and holds its cut face in positive engagement with the pitting plate with one end of each of the small and large diameters of its pit lying on the reference lines above referred to. At this point the air cylinders serve to spread the fingers 253, whereupon the transfer mechanism moves forward to repeat its cycle of operation. The upward movement of the peach holder 385 depresses the crank 375, which in turn serves to shift or displace the pitting knife 369 in a direction having vertical, lateral, and longitudinal components, all as above explained. This adjustment having been accomplished, the knife 369 as shown in Figure 25 is made to rotate in a clockwise direction around the pit so that it cuts through the flesh of the half peach immediately adjacent its half pit from the stem end to the flower end. This direction of rotation is of some importance, for in starting the cut at the stem end of the half peach, danger of impairing the arch of the half peach is obviated. After the knife 369 has completed its cut, the peach holder 385 is lowered so that the next succeeding peach half may be slid between it and the pitting plate 372 by the transfer mechanism.

Although the cylinders 231 have for the purpose of illustration been shown as circular cylinders, this is not necessary, for obviously the function of these cylinders could be just as well accomplished by a member of any cross sectional shape. Therefore, for the purpose of construing the appended claims the term "cylinder" shall be deemed as including any member on which the peach gripping fingers may be carried. Furthermore, the peach gripping fingers may be spread and contracted mechanically or magnetically rather than pneumatically, as shown and described.

Modification

As in the case of the machine described in connection with Figures 1 to 26 inclusive, the modification shown in Figures 27 and 28 utilizes a splitter 401, a pitter 402, a feed mechanism 403 for delivering peaches to the splitter, and a transfer mechanism 404 for transferring half peaches from the splitter to the pitter. The construction and operation of the feed mechanism and splitter are essentially the same as the construction and operation of the corresponding elements described in connection with Figures 1 to 26, inclusive, and therefore will not be described in further detail. The pitter, however, differs in that a single pitting knife oscillates between two spaced, parallel, vertically disposed pitting plates to successively pit the peach halves held in contact with the apertured faces of the plates. Since the faces of the pitting plates lie in planes parallel to the vertical plane defined by the splitting blades, the cylinders associated with the transfer mechanism always move parallel to their own axis rather than rotate through an angle of 90° as required in the machine shown in Figures 1 to 26 inclusive.

Modified pitter

The pitter 402 comprises a forwardly inclined plate 405 secured across the frame of the machine (Figs. 2, 7, 30). Depending from the plate 405 is a pair of spaced lugs 406 each carrying at its lower end a pitting plate 407 formed with a pitting aperture 408 (Fig. 30). The pitting plates 407 lie in vertical planes on either side of the plane defined by the blades of the splitter. Oscillating about a pin 409 fixed to the plate 405 is a pitting knife oscillating mechanism 411 consisting of a sleeve 412 journaled on the pin 409 and formed with a pair of spaced superposed brackets 413 and 414 (Fig. 30) and with a pair of arcuate fingers 415 (Fig. 27). Journaled on the pin 409 immediately above the sleeve 412 is a pinion 416 arranged to mesh with a gear 417 carried by a boss 418 formed as a part of the bracket 413 (Fig. 30). In mesh with the gear 417 is a gear 419 fixed to the upper end of a shaft 421 journaled in the brackets 413 and 414 and carrying an arcuate or spoon-shaped pitting knife 422 at its lower end, in registration with the apertures 408. The shaft 421 is arranged to move longitudinally within its bearings in the brackets 413 and 414 and the face of the gear 419 is substantially longer than the face of the gear 417 so that these gears are always in mesh even though there is some longitudinal movement of the shaft 421. Depending from the bracket 413 is a pair of spaced ears 423 in which is pivoted a bell crank 424. The bell crank 424 is formed with an arm 425 engageable in a circumferential channel 426 and with a pair of arms 427 arranged to straddle the bracket 414. Formed on the plate 405 is a pair of spaced lugs 428 (Fig. 27) disposed in the path of movement of the bell crank arms 427 and which if desired may be provided with a pair of adjustable limit screws. Continued movement in either direction of the pitting knife oscillating mechanism 411 about the pin 409 after one of the bell crank arms 427 has contacted its associated lug 428 will result in a longitudinal movement of the shaft 421 and a consequent shift in the position of the knife 422 with respect to the apertured pitting plates 407.

Rotation of the pinion 416 and consequently the pitting knife 422 is accomplished by a rack 431 (Figs. 27, 30) held in engagement with the pinion by a guide 432 carried by the pin 409 and reciprocated by a crank 433 fixed to a pin 434. The pin 434 is journaled in an offset bracket 435 formed as part of the plate 405 and carries at its lower end a beveled gear 436 (Fig. 30). Formed as an extension of the plate 405 is a bracket 437 in which is journaled a shaft 438 carrying at one end a beveled gear 439 in mesh with the beveled gear 436 and at its other end a sprocket 441. The sprocket 441 is driven by a chain 442 in mesh with a sprocket 443 carried by a shaft 444 journaled in a gear box 445. The reciprocatory movement of the rack 431 serves to rotate the pitting knife 422 first in one direction and then in the opposite direction so that regardless of which of the opposed peach halves it is operating on, its cut is always made from the stem end of the peach to its flower end.

Oscillation of the pitting knife oscillating mechanism 411 is accomplished through a lever 446 pivoted to a link 447. Pivoted to an extension 448 of the plate 405 is a bell crank 449 having one of its arms connected to the link 447 and the other to a rod 451 (Fig. 30). The rod 451 slides within a sleeve 452 formed on the upper end of a rod 453. Telescopic movement of the rod 451 within the sleeve 452 is resisted by a coil spring 454 attached at one end to the rod and at the other to the sleeve, this assembly forming a lost motion connection. Pivoted to the gear box 445 is an arm 455 connected at its outer end to the rod 453 and carrying intermediate its ends a roller 456. The roller is arranged to ride on a cam 457 carried on a shaft 458 journaled in the gear box 445.

Figure 31:
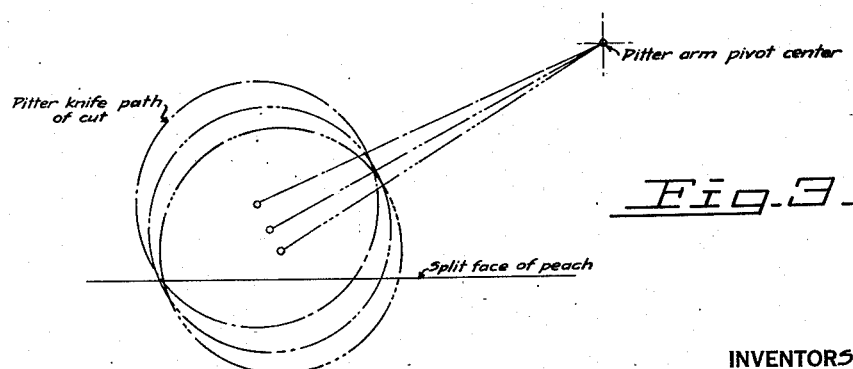
Figure 31 is a diagrammatic plan view of the pitting knife adjusting mechanism used in the modification shown in Figures 27 and 30.

Depending from the plate 405 is a pair of bearings or sleeves 461 within each of which is journaled a shaft 462. The lower end of each shaft carries a peach holder 463 in alignment with the apertures 408 of the pitting plate 407. Fixed to the upper end of each shaft 462 is a beveled gear 464 arranged to mesh with a beveled gear 465 journaled on the end of a shaft 466 (Figs. 27, 30). The shaft 466 is journaled in bearings 467 (Fig. 27) carried by the plate 405 and has fixed to it intermediate its ends a crank 468. A lost motion connection between the shaft 466 and each of the beveled gears 465 is effected by a spring 469 fixed at one end to the shaft and at the other to the beveled gear. Secured to the upper end of each of the shafts 462 is a cam or stop 471 disposed in the line of movement of one of the fingers 415. Since the travel of each peach holder 463 is dependent upon the size of the half peach which it engages, since each peach holder and stop 471 are fixed to the shaft 462, and since the stop 471 in conjunction with the finger 415 limits the travel of the pitting knife oscillating mechanism 411, it will be seen that the depth of cut made by the pitting knife 422 depends upon the size of the half peach. This action is shown in Figure 31, from which it will be noted that for all practical purposes the circles defined by the rotation of the pitting knife regardless of the center upon which the knife rotates intersect at a common point lying in the plane of the pitting plate. However, to obtain this result, it is essential that the radius on which the pitting knife rotates (the distance between the shaft 462 and the shaft 421) be substantially equal to the distance between the opposed pitting plates 407. In a working model embodying the objects of this invention, the distance between these plates is three inches and the diameter of the pitting knife one and five sixteenths inches. The transfer mechanism operates to deliver a half peach to the pitting plate in such a manner that regardless of the size of the half peach the stem end of its pit lies on a line intersecting this point and parallel with the axis of the pitting knife.

Furthermore, the bell crank 424 serves to lift the pitting knife 422 in relation to the size of the peach and therefore to orient the knife properly with respect to the pit, provided that the peach half regardless of its size is always located by the transfer mechanism with two edges of the pit at a predetermined position on the pitting plate.

Periodic oscillation of the shaft 466 is effected by a connecting rod 472 pivoted at its upper end to the crank 468 and at its lower end to a crank (not shown) driven by the shaft 458.

Modified transfer mechanism

The transfer mechanism 404 is carried on an arm 481 pivoted to the frame of the machine and oscillating between the splitter and the pitter. Movement of the arm 481 is effected through the rotation of the shaft 458 through a lost motion connection 482 (Fig. 30) in the same manner as described in connection with the modification shown in Figures 1 to 26 inclusive. The arm 481 is formed on its upper end with a cross member 483 (Fig. 27) provided at each end with a pair of spaced ears 484. Pivoted to each pair of ears 484 are parallel links 485, the outer ends of which are in turn pivoted to air cylinders 486. Each of the air cylinders 486 carries two pairs of spaced peach engaging fingers 487 and preferably the upper fingers of each pair are pivoted to their associated cylinder for limited movement so as to enable the fingers to engage the periphery of the peach half regardless of its contour. The construction and operation of the air cylinders and their associated fingers are identical with the construction and operation of the corresponding elements described in connection with Figures 1 to 26 inclusive. Carried on the outer side of each cylinder is a pair of rolls 488 adapted to straddle and travel along a tortuous track 489 supported in any suitable manner from the frame of the machine. The shape of the track 489 is such that the fingers 487 are made to engage the splitting blades at the end of the forward throw of the arm 481 and to engage the pitting plate 407 at the end of the rearward throw of the arm. The air hose and valve for operating the air cylinders are identical with the corresponding elements described in connection with Figures 1 to 26 inclusive, and therefore need not be further described in connection with this modification. Since a parallelogram is formed by the links 485, the cylinder 486, and the ears 484, the spring fingers 487 can only move parallel to themselves and consequently the cut face of a peach half always lies in a plane parallel to the plane defined by the splitting blades.

Modified driving mechanism

The driving mechanism contained within the gear box 445, although of necessity not identical with the driving mechanism described in connection with Figures 1 to 26 inclusive, is very similar to it, and in view of the detailed disclosure made of the driving mechanism described for operating the machine illustrated in Figures 1 to 26 inclusive, it is believed that any individual skilled in the art could readily design the required mechanical movements.

Alternative pitting knife adjusting mechanism

In Figures 28 and 29 another device is diagrammatically shown for adjusting the cut to be taken by the pitting knives. In general, this mechanism comprises a support 491 depending from the machine frame and carrying a forwardly extending spring finger 492 in line with the splitting blades 493 and 494. Screwed to the spring finger 492 is a collar 495 within which is slidably arranged a rod 496 terminating at its forward end with a pair of peach calipers 497 and pivoted at its rear end to a bell crank 498. The bell crank 498 is pivoted to the machine frame and is actuated by a connecting rod 499. Associated with the upper end of the bell crank 498 is a notched lever 501 carried by the machine frame and actuated by a connecting rod 502. The upper end of the bell crank 498 is urged forwardly by a spring 503 secured to the support 491. In operation, the feed mechanism impales a peach 504 on the splitting blades 493 and 494 and in so doing serves through suitable cranks and links (not shown) to disengage the notched end of the lever 501 from the upper end of the bell crank 498. This permits the calipers 497 to move forwardly into engagement with the flower end of the peach and the connecting rod 499 to move downwardly. The movement of the connecting rod 499 is then transmitted through suitable cranks and levers (not shown) to the bell crank 375 of the machine shown in Figures 1 to 26 inclusive. The forward movement of the feed mechanism (to pick up the next peach) raises the connecting rod 502 and thereby locks the notched end of the lever 501 with the upper end of the bell crank 498 so as to hold the pitting knife in its adjusted position during the pitting operation.

We claim:

1. A device of the character described, comprising: a peach splitter; a peach pitter including a pitting knife; means for positioning a peach on said splitter so that one of the ends of the small diameter of its pit in the plane of its suture and one of the ends of the large diameter of said pit lie on predetermined intersecting lines prior to the splitting operation; a transfer mechanism for holding one of the peach halves in said position during the splitting operation and for thereafter moving said peach half to said pitter and positioning said peach half thereon so that the said ends of said small and large diameters assume a predetermined position with respect to said pitter; and movable means engageable with the outer surface of said peach half for movement to a degree in proportion to the size of the fruit half and connected with said pitting knife for centering the latter over the pit of said peach half.

2. A device of the character described, comprising: a peach splitter including a pair of relatively movable splitting blades defining a plane containing a pair of fixed intersecting but imaginary reference lines; a pitting plate containing a corresponding pair of predetermined but imaginary reference lines and formed with a pitting aperture; means for positioning a peach on said splitter with its pit in a predetermined relation with respect to the said reference lines of said splitter; means for grasping said peach with its pit in said predetermined relation during the splitting operation; means for transferring a peach half from said splitter to said pitting plate with its pit in registration with said aperture in the same relative position with respect to the reference lines of the pitting plate as it had during the splitting operation with respect to the reference lines of the splitter; a bodily movable pitting knife associated with said pitting plate and arranged to operate through said aperture; means dependent upon the size of said peach half for centering said pitting knife over its pit; and means for operating said pitting knife.

3. A device of the character described, comprising: a peach splitter including a pair of relatively movable splitting blades defining a plane containing a pair of fixed but imaginary reference lines; a pitting plate containing a corresponding pair of predetermined but imaginary intersecting reference lines and formed with a pitting aperture; means for positioning a peach on said splitter with its pit in a predetermined relation with respect to the said reference lines of said splitter; means for grasping said peach with its pit in said predetermined relation during the splitting operation; means for transferring a peach half from said splitter to said pitting plate with its pit in registration with said aperture in the same relative position with respect to the reference lines of the pitting plate as it had during the splitting operation with respect to the reference lines of the splitter; and a pitting knife associated with said pitting plate.

4. A device of the character described, comprising: a peach splitter having two relatively movable pit splitting blades lying in a common plane; means for impaling a peach on said blades with its pit in a predetermined position with respect to three fixed reference planes; a peach pitter including a pitting plate formed with a pitting aperture and provided with a bodily movable pitting knife arranged to operate through said aperture; a transfer mechanism arranged to operate between fixed points adjacent said splitter and pitter; movable gripping means carried by said transfer mechanism for gripping the flesh of a peach half while said peach is impaled on said blades with its pit in said predetermined position and for holding said peach half against relative movement with respect to said transfer mechanism while said transfer mechanism is traveling between said splitter and pitter and delivering said peach half to said pitting plate with its pit in registration with said aperture; means dependent upon the size of said peach half for transversely centering said pitting knife over the half pit of said peach half as said peach half lies in registration with said aperture; and means for causing said pitting knife to circumscribe said half pit.

5. In a peach splitter and pitter wherein a peach and its pit are split substantially along the plane of the suture of the pit at a splitting station and wherein the half pit of one of the resulting peach halves is removed at a pitting station; a transfer mechanism operating between fixed points adjacent said stations and provided with a pair of cooperating peach half gripping members each arranged for rectilinear movement in either direction with respect to a common reference line; means for urging said gripping members together; and means for locking said gripping members against relative movement with respect to said transfer mechanism when the gripping members are in engagement with a peach half.

6. A combination peach splitter and pitter, comprising: a pair of coplanar relatively movable substantially parallel splitting blades; a transfer mechanism mounted for generally reciprocatory movement between said splitting blades and said pitter; means for so moving said transfer mechanism; and lost motion mechanism for causing said transfer mechanism to hesitate at said blades and at said pitter.

7. A combination peach splitter and pitter, comprising: a pair of coplanar relatively movable substantially parallel splitter blades; a pitter spaced from said blades; a feed mechanism reciprocating to and from said blades for periodically impaling a peach on said blades with its pit lying between and in the plane of said blades; a lost motion mechanism causing said feed mechanism to hesitate at the end of its outward stroke; a transfer mechanism reciprocating between said blades and said pitter for transferring a peach half from said blades to said pitter; and a lost motion mechanism for causing said transfer mechanism to hesitate at said blades and at said pitter.

8. A device of the character described, comprising: a pair of coplanar relatively movable normally spaced substantially parallel splitting blades; a feed mechanism reciprocating to and from said blades; a lost motion mechanism associated with said feed mechanism for causing said mechanism to hesitate at its outward throw; a pitter spaced from said blades; a transfer mechanism reciprocating between said blades and said pitter; a lost motion mechanism associated with said transfer mechanism for causing said transfer mechanism to hesitate while adjacent said blades; and a second lost motion mechanism associated with said transfer mechanism for causing said transfer mechanism to hesitate while adjacent said pitter.

9. A combination peach splitter and pitter, comprising: a pair of coplanar relatively movable blades having substantially parallel cutting edges; means associated with one of said blades for preventing said blade from passing through a peach pit; a feed mechanism for impaling a peach on said blades with its pit lying between and in the plane of said blades; a pitter spaced from said blades; and a transfer mechanism for transferring a peach half from said blades to said pitter.

10. A combination peach splitter and pitter, comprising: a pair of coplanar relatively movable splitting blades having a pair of substantially parallel coacting cutting edges; an anvil formed on one of said cutting edges for preventing said cutting edge from passing through a peach pit; a feed mechanism for impaling a peach on said blades; a pitter; and a transfer mechanism reciprocating between said blades and said pitter for transferring a peach half from said blades to said pitter.

11. A combination peach splitter and pitter, comprising: a pair of coplanar relatively movable substantially parallel blades; a feed mechanism for impaling a peach on said blades with its pit lying between and in the plane of said blades; a pitter spaced from said blades; a transfer mechanism movable between said blades and said pitter; opposed relatively movable peach gripping fingers carried by said transfer mechanism and each arranged for rectilinear movement in either of two directions; and means associated with said opposed fingers for causing them to contract and expand upon and away from a peach half.

12. A transfer mechanism for transferring a peach half from a peach splitter to a peach pitter, comprising: a member movable between said splitter and pitter; a cylinder carried by said member; a pair of opposed collars slidable on said cylinder; peach gripping fingers carried by said collars; means for normally urging said collars together; and means for periodically moving said collars apart.

13. A transfer mechanism for transferring a peach half from a peach splitter to a peach pitter, comprising: a member movable between said splitter and pitter; a cylinder carried by said member; a pair of opposed collars slidable on said cylinder; peach gripping fingers carried by said collars, at least one of said fingers being resiliently mounted on one of said collars so as to permit of slight relative movement between said collar and its associated finger; means for normally urging said collars together; and means for periodically moving said collars apart.

14. A transfer mechanism for transferring a peach half from a peach splitter to a peach pitter, comprising: a member movable between said splitter and pitter; a fluid cylinder carried by said member and provided at either end with longitudinally aligned slots; a pair of opposed collars slidably disposed on said cylinder and each provided with a finger extending through said slots into said cylinder; means for normally urging said collars together; a pair of pistons disposed within said cylinder and between said fingers; means for creating a fluid pressure between said pistons; and peach gripping means carried by said collars.

15. A peach splitter comprising: a pair of coplanar normally spaced relatively movable splitting blades; a peach pit arresting means associated with one of said blades; feed mechanism for periodically impaling a peach on said blades with its pit disposed between and in the plane of said blades; a lost motion mechanism for bringing said blades into engagement with opposed edges of said pit; and means for then forcing one of said blades through said pit and for returning said blades to their normally spaced position.

16. A transfer mechanism for transferring a peach half from a peach splitter to a peach pitter, comprising: a member movable between said splitter and pitter; a cylinder carried by said member; a pair of opposed collars slidable on said cylinder; peach gripping fingers carried by said collars; means for normally urging said collars together; means for periodically moving said collars apart; and means for oscillating said cylinders through an arc of substantially 90°.

17. A transfer mechanism for transferring a peach half from a peach splitter to a peach pitter, comprising: a member movable between said splitter and pitter; a fluid cylinder carried by said member and provided at either end with longitudinally aligned slots; a pair of opposed collars slidably disposed on said cylinder and each provided with a finger extending through said slots into said cylinder; means for normally urging said collars together; a pair of opposed pistons disposed within said cylinder and between said fingers; means for creating a fluid pressure between said pistons; peach gripping means carried by said collars; and means for bodily oscillating said cylinder through an arc of substantially 90°.

18. A device of the character described, comprising: a pair of coplanar substantially parallel relatively movable splitting blades; an apertured pitting plate disposed in a plane intersecting the plane of said splitting blades; a pitting knife operable through said apertured pitting plate; a transfer member movable between points adjacent said splitting blades and said pitting plate; a half peach engaging member carried by said transfer member; and means for oscillating said peach engaging member during the travel of the transfer member between the splitting blades and the pitting plate in such a manner that the peach engaging member will successively contact the splitting blades and the pitting plate.

19. A device of the character described, comprising: a frame; a splitter and pitter supported in spaced relation on said frame; a transfer mechanism movable between said splitter and pitter; a pitting knife positioning mechanism movably mounted on said frame; means for bodily oscillating said positioning mechanism in an arcuate path; a shaft journaled in said positioning mechanism with its axis intersecting any plane defined by the movement of any point on said positioning mechanism; a pitting knife carried by said shaft; and an apertured pitting plate carried by said frame adjacent said pitting knife.

20. A device of the character described, comprising: a peach splitter; a peach pitter lying in a plane parallel to the plane of said splitter and offset therefrom; a transfer member movable between points adjacent said splitter and pitter; a parallelogram mechanism carried by said transfer mechanism; a half peach gripping member carried by said parallelogram mechanism; and an offset track associated with said parallelogram mechanism for causing said peach gripping member to contact successively said splitter and pitter.

21. A device of the character described, comprising: a frame; a pair of substantially parallel coplanar relatively movable splitting blades mounted on said frame; a pair of spaced parallel apertured pitting plates fixed to said frame, said plates being disposed in planes parallel to and on either side of the plane of said splitting blades; a duplicate transfer mechanism arranged to move from said splitting blades to said pitting plates; and a pitting knife arranged to oscillate bodily between said pitting plates in registration with the apertures therein.

22. A device of the character described, comprising: a frame; a pair of coplanar relatively movable splitting blades mounted on said frame; a pair of spaced parallel apertured pitting plates fixed to said frame, said plates being disposed in planes parallel to and on either side of the plane of said splitting blades; a duplicate transfer mechanism arranged to travel from said splitting blades to said pitting plates; a pitting knife arranged to oscillate bodily between said pitting plates in registration with the apertures therein; and a half peach holder associated with each pitting plate for holding a half peach in engagement therewith.

23. A device of the character described, comprising: a splitter; a pair of spaced parallel apertured pitting plates disposed in planes parallel to and on either side of the plane of said splitter; a duplicate transfer mechanism arranged to travel from said splitter to said pitting plates; and a pitting knife arranged to oscillate bodily between said pitting plates on a radius substantially equal to the distance between said pitting plates.

24. A device of the character described, comprising: a frame; a pair of substantially parallel coplanar relatively movable splitting blades mounted on said frame; a pair of spaced parallel apertured pitting plates fixed to said frame, said plates being disposed in planes parallel to and on either side of the plane of said splitting blades; a duplicate transfer mechanism arranged to reciprocate between said splitting blades and said pitting plates; a pitting knife arranged to oscillate bodily between said pitting plates in registration with the apertures therein; a half peach holder associated with each pitting plate for holding a half peach in engagement therewith; and means associated with each half peach holder for limiting the oscillatory movement of said pitting knife between said pitting plates.

25. A device of the character described, comprising: a frame; a pair of coplanar relatively movable splitting blades mounted on said frame and having substantially parallel cutting edges; a pair of spaced parallel apertured pitting plates fixed to said frame, said plates being disposed in planes parallel to and on either side of the plane of said splitting blades; a duplicate transfer mechanism arranged to travel from said splitting blades to said pitting plates; a pitting knife arranged to oscillate bodily between said pitting plates in registration with the apertures therein; and means for effecting a displacement of said pitting knife in a line perpendicular to the plane in which said pitting knife oscillates.

26. A device of the character described, comprising: a frame; a pair of coplanar relatively movable splitting blades mounted on said frame and having substantially parallel cutting edges; a pair of spaced parallel apertured pitting plates fixed to said frame, said plates being disposed in planes parallel to and on either side of the plane of said splitting blades; a duplicate transfer mechanism arranged to travel from said splitting blades to said pitting plates; a pitting knife arranged to oscillate bodily between said pitting plates in registration with the apertures therein; a half peach holder associated with each pitting plate for holding a half peach in engagement therewith; means associated with each half peach holder for limiting the oscillatory movement of said pitting knife between said pitting plates; and means dependent upon the extent of the oscillatory movement of said pitting knife for effecting a displacement of said pitting knife in a line perpendicular to the plane in which said pitting knife oscillates.

27. A device of the character described, comprising: a frame; a pair of coplanar relatively movable splitting blades mounted on said frame and having substantially parallel cutting edges; a pair of spaced parallel apertured pitting plates fixed to said frame, said plates being disposed in planes parallel to and on either side of the plane of said splitting blades; a duplicate transfer mechanism arranged to travel from said splitting blades to said pitting plates; a pitting knife arranged to oscillate bodily between said pitting plates in registration with the apertures therein; and means for rotating said knife in one direction when said knife is in registration with the aperture of one of said pitting plates and for rotating said knife in the opposite direction when it is in registration with the aperture of the opposed pitting plate.

28. A device of the character described, comprising: a frame; a pair of coplanar relatively movable splitting blades mounted on said frame and having substantially parallel cutting edges; a pair of spaced parallel apertured pitting plates fixed to said frame in planes substantially parallel to and on either side of the plane of said splitting blades; a duplicate transfer mechanism arranged to travel from said splitting blades to said pitting plates; a pitting knife oscillating mechanism pivoted at one end to said frame intermediate said pitting plates; a shaft journaled in said pitting knife oscillating mechanism; a pitting knife carried by said shaft in line with the apertures in said pitting plates; means for oscillating said pitting knife oscillating mechanism between said pitting plates; and means for rotating said shaft.

29. A device of the character described, comprising: a frame; a pair of coplanar relatively movable splitting blades mounted on said frame and having substantially parallel cutting edges; a pair of spaced parallel apertured pitting plates fixed to said frame in planes substantially parallel to and on either side of the plane of said splitting blades; a duplicate transfer mechanism arranged to reciprocate between said splitting blades and said pitting plates; a pitting knife carrier pivoted at one end to said frame intermediate said pitting plates; a shaft journaled in said carrier; a pitting knife carried by said shaft in line with the apertures in said pitting plates; a pinion keyed to said shaft; a reciprocating rack associated with said pinion; and means for oscillating said carrier between said pitting plates.

30. A peach splitter comprising a pair of coplanar blades having normally spaced, opposed edges and arranged for relative rectilinear movement so that said opposed edges may be made to advance toward or recede from each other; lateral cutting edges formed on the corresponding lateral edges of each of said blades adjacent their opposed edges so that a peach may be impaled on said blades with its suture lying in the plane of said blades and with its pit lying between said opposed edges; a cutting edge formed on one of said opposed edges and an anvil formed on the other of said opposed edges for arresting relative movement between the pit and anvil; means for impaling a peach on said blades with its pit lying therebetween; and means for moving said blades together.

31. A peach splitter comprising a pair of coplanar blades having normally spaced, opposed edges and arranged for relative rectilinear movement so that said opposed edges may be made to advance toward or recede from each other; lateral cutting edges formed on the corresponding lateral edges of each of said blades adjacent their opposed edges so that a peach may be impaled on said blades with its suture lying in the plane of said blades and with its pit lying between said opposed edges; a cutting edge formed on one of said opposed edges and an anvil formed on the other of said opposed edges for arresting relative movement between the pit and anvil; means for impaling a peach on said blades with its pit lying therebetween; means for moving said blades toward each other until said pit is engaged on opposite sides by the opposed edges of said blades; means for permitting said blades to hesitate while in this latter position; and means for then moving one of said blades through said pit.

32. A peach splitter comprising a pair of coplanar blades having normally spaced, opposed edges and arranged for relative rectilinear movement so that said opposed edges may be made to advance toward or recede from each other; lateral cutting edges formed on the corresponding lateral edges of each of said blades adjacent their opposed edges so that a peach may be impaled on said blades with its suture lying in the plane of said blades and with its pit lying between said opposed edges; a cutting edge formed on one of said opposed edges and an anvil formed on the other of said opposed edges for arresting relative movement between the pit and anvil; means for impaling a peach on said blades with its pit lying between the opposed edges of said blades and with the stem end of the pit lying on a predetermined fixed point; means for causing relative movement of said blades toward each other until said pit is engaged on opposite sides by the opposed edges of said blades; transfer means for then grasping and holding each half peach against further relative movement of said blades; and means for causing further relative movement of said blades toward each other for the purpose of splitting said pit.

33. A device of the character described, comprising: a splitting station; a pitting station; a transfer mechanism operating between said stations; a pair of coplanar blades associated with said splitting station having normally spaced, opposed edges arranged for relative rectilinear movement so that said opposed edges may be made to advance toward or recede from each other; lateral cutting edges formed on the corresponding lateral edges of each of said blades adjacent their opposed edges so that a peach can be impaled on said blades with its suture lying in the plane of said blades and with its pit lying between said opposed edges; a cutting edge formed on one of said opposed edges and an anvil formed on the other of said opposed edges for arresting relative movement between the pit and said anvil; a feed mechanism reciprocating to and from said splitting station for periodically impaling a peach on said blades with its pit lying between the opposed edges of said blades and with the stem end of the pit lying on a predetermined fixed point; means for causing relative movement of said blades toward each other until said pit is clamped between the opposed edges of said blades; half peach grasping and holding fingers slidably associated with said transfer mechanism for rectilinear movement with respect thereto in either direction relative to a common reference line; means associated with said transfer mechanism for causing said fingers to conform about, grasp, and lock themselves over one half of said peach while its pit is clamped between said blades; means for then causing one of said blades to complete its cut through said peach and pit; an apertured pitting plate associated with said pitting station; means for causing said transfer mechanism to deliver a peach half to said pitting plate; a pitting knife arranged for rotation through said apertured plate and for bodily displacement in a direction having three components corresponding respectively to the depth, width and length of a pit; means for bodily displacing said pitting knife in proportion to the size of the peach half being pitted; and means for then rotating said pitting knife about the peach pit.

JOSEPH PERRELLI.
ROBERT H. SMILIE.